(12) United States Patent
Priest

(10) Patent No.: US 6,726,466 B2
(45) Date of Patent: Apr. 27, 2004

(54) INJECTION BLOW MOLDING MACHINE AND CLAMPING DEVICE

(75) Inventor: Walter L. Priest, Adrian, MI (US)

(73) Assignee: Jomar Corp., Egg Harbor Township, NJ (US)

( * ) Notice: Subject to any disclaimer, the term of this patent is extended or adjusted under 35 U.S.C. 154(b) by 0 days.

(21) Appl. No.: 10/392,205

(22) Filed: Mar. 19, 2003

(65) Prior Publication Data
US 2003/0180410 A1 Sep. 25, 2003

Related U.S. Application Data
(60) Provisional application No. 60/365,924, filed on Mar. 20, 2002.

(51) Int. Cl.[7] .......................... B29C 49/06; B29C 49/36; B29C 49/56
(52) U.S. Cl. .......................... 425/533; 29/428; 264/538; 425/450.1; 425/540; 425/541; 425/589
(58) Field of Search ........................ 264/538; 425/450.1, 425/533, 540, 541, 589; 29/428

(56) References Cited

U.S. PATENT DOCUMENTS

| 3,761,219 A | * | 9/1973 | Flynn et al. ................. 425/533 |
| 3,920,364 A | * | 11/1975 | Cadogan-Rawlinson . 425/450.1 |
| 3,964,852 A | * | 6/1976 | Marfiewicz .................. 425/541 |
| 4,594,067 A | * | 6/1986 | Langos ........................ 425/589 |
| 4,786,245 A | * | 11/1988 | Windstrup et al. ........... 425/541 |
| 4,822,274 A | * | 4/1989 | Chan et al. ............... 425/450.1 |
| 5,129,814 A | * | 7/1992 | Farrell ......................... 425/533 |
| 5,321,341 A | * | 6/1994 | Kamp et al. ................. 425/533 |
| 5,531,580 A | * | 7/1996 | Bonino et al. .............. 425/541 |
| 5,552,105 A | * | 9/1996 | Konefal ....................... 264/538 |
| 5,620,723 A | * | 4/1997 | Glaesener et al. .......... 425/589 |
| 5,624,695 A | * | 4/1997 | Glaesener et al. .......... 425/589 |
| 5,645,875 A | * | 7/1997 | Glaesener et al. .......... 425/589 |
| 5,730,927 A | * | 3/1998 | Rader et al. ................ 425/541 |
| 5,773,050 A | * | 6/1998 | Wohlrab ..................... 425/589 |
| 5,895,670 A | * | 4/1999 | Jaroschek et al. .......... 425/589 |
| 6,334,768 B1 | * | 1/2002 | Looije et al. ............... 425/541 |

\* cited by examiner

Primary Examiner—Robert B. Davis
(74) Attorney, Agent, or Firm—Philip O. Post

(57) ABSTRACT

A clamping device for an injection blow molding machine incorporates separate clamp movement actuators for joining or separating opposing mold parts and clamping actuators for applying a clamping force to closed mold parts. Opposing locking columns and locking collars are locked together and a clamping force is applied to opposing locked columns and collars. A stroke movement of the locking collars can optionally be provided to allow maximum clamp area clearance for a preform or blow-molded product entering or leaving the clamp area. The distance of stroke movement can be adjusted to accommodate molds of varying sizes.

39 Claims, 10 Drawing Sheets

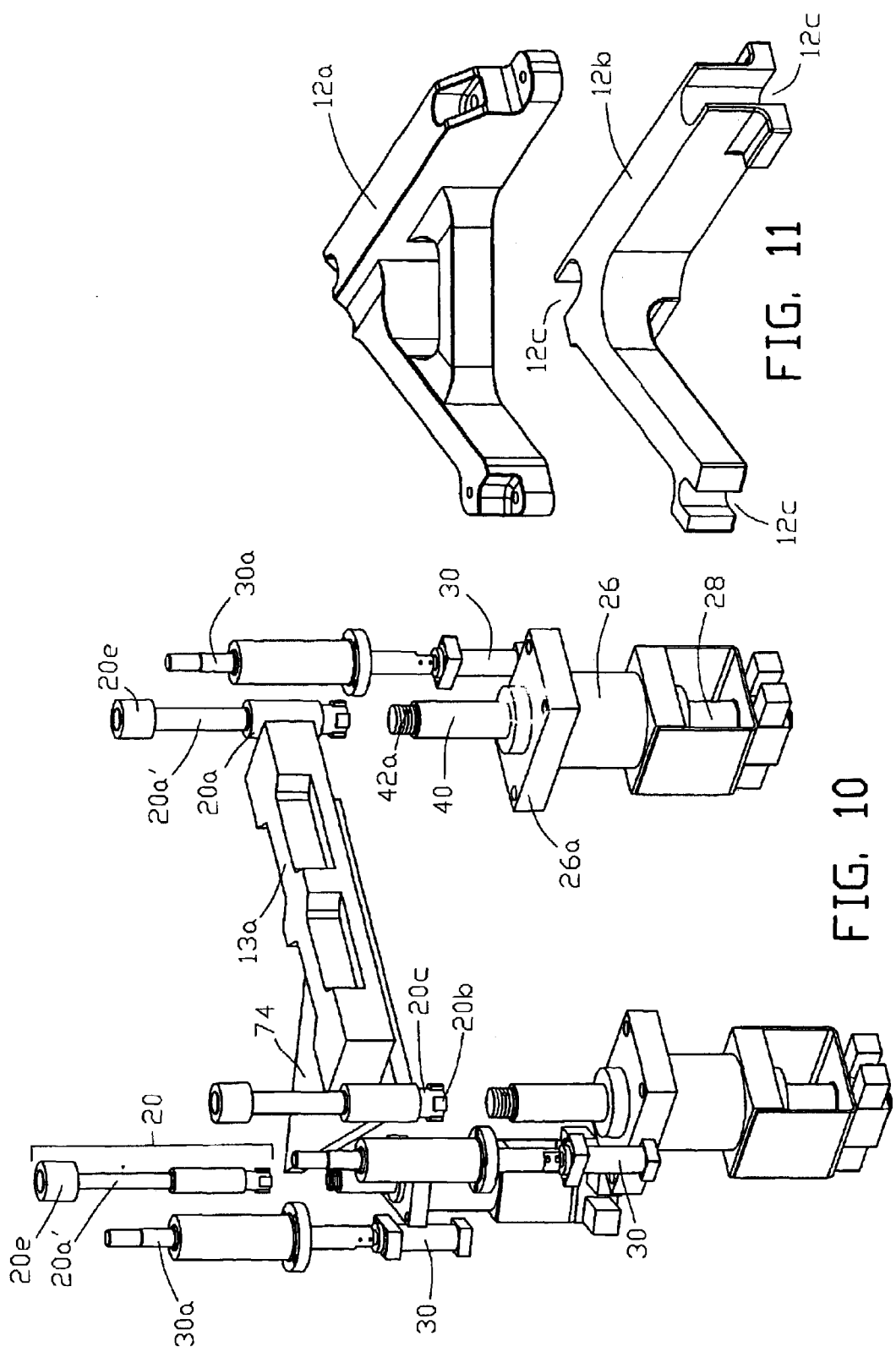

INJECTION BLOW MOLDING MACHINE AND CLAMPING DEVICE

CROSS REFERENCE TO RELATED APPLICATIONS

This application claims the benefit of U.S. Provisional Application No. 60/365,924, filed Mar. 20, 2002.

FIELD OF THE INVENTION

The present invention generally relates to injection blow molding machines, and in particular to clamping devices that are used to apply a clamping force to mold parts used in injection blow molding machines.

BACKGROUND OF THE INVENTION

A typical thermoplastic injection blow molding machine uses a clamping device to apply a clamping force that holds the parts of a mold together while either a hot thermoplastic resin is injected into a clamped injection mold to form a preform (parison), or a gas (typically air) is injected into a preform to form a blow-molded product, such as a bottle or other container, that takes on the shape of the interior of the clamped blow mold. A mold generally comprises a two-part machined article. Adjoining faces of the mold parts, or halves, are brought together and clamped for forming the preform or product, and separated for releasing the preform or product from the mold. For the typical three-station injection blow molding machine, a core rod is used to transfer the preform from the injection station to the blow mold station, and to transfer the product from the blow mold station to the product removal station where the product is stripped from the core rod.

There are generally two types of clamping devices. The first is referred to as a C-frame design that has a series of hydraulic clamping cylinders mounted directly to the C-frame assembly. Clamping cylinders are mounted over the mold parts and push downward against the top of the mold parts to apply clamping force. A benefit of the C-frame design is the absence of any frame components or tie bars in the molding area (i.e., the volume between the mold parts when the clamping device is in the opened position) that could limit access to the molding area. The mold parts are clamped between the overhead cylinders and a machine table that forms a fixed platen for the lower mold half. Therefore the frame of the machine must resist the clamping forces exerted by the hydraulic clamping cylinders. However, in this arrangement, the cylinders are more readily accessed for maintenance and replacement.

The second type of clamping device is referred to as a tie-bar design that incorporates a pair of tie-bars and bushings connecting an upper and lower yoke assembly. The machine table is situated directly between the two yoke assemblies. Hydraulic cylinders are mounted under the machine table between the table and the lower yoke assembly. As the actuators on the hydraulic cylinders extend, the upper yoke assembly is pulled downward toward the table, and the mold parts are clamped between the machine table and upper yoke assembly. For this design, the structural frame of the machine does not have to resist the clamping forces. However, as the blow-molded product increases in diameter, the height of the joined blow mold halves increases. Consequently, the length of tie bars and mold strokes require that the table height be increased, since the lower yokes must move the same distance as the upper yokes. The height requirement of the table can become so great that a raised structural platform must be provided for an operator to operate the machine. Hydraulic cylinders are located beneath the table. Further maintenance or replacement of the hydraulic cylinders is difficult due to the location of the cylinders.

Therefore, there is the need for an improved clamping device that will provide unrestricted access to the molding area of the machine and allow better arrangement of machine components.

BRIEF SUMMARY OF THE INVENTION

In one aspect, the present invention is an apparatus for and method of clamping a multi-part mold used in an injection blow molding machine and process wherein two or more locking columns are commonly mounted with a first mold part, and two or more locking collars are commonly mounted with a second opposing mold part. To clamp the mold parts, the first mold part, and two or more locking columns, are moved towards the second opposing mold part and two or more locking collars so that the opposing facing surfaces of the mold parts meet, and the columns lock into the collars. After locking, clamping force is applied to the mold parts by the interlocked column and collar elements. Columns and collars may be arranged to provide a maximum clearance distance between the mold parts in the opened position. The means for bringing the first and second mold parts together and separating them is separate from the clamping means.

In another aspect, the present invention is an apparatus for and method of injection blow molding wherein at least the injection mold parts or the blow mold parts are clamped together by joining two or more locking columns, commonly mounted with a first mold part, with two or more locking collars, commonly mounted with a second mold part. After joining opposing surfaces of the first and second mold parts and locking opposing two or more locking columns and collars, clamping force is applied to the mold parts by the interlocked column and collar elements. The means for bringing the first and second mold parts together and separating them is separate from the clamping means.

In another aspect, the present invention is an apparatus for and method of injection blow molding wherein the injection mold parts and the blow mold parts are clamped together by joining at least three locking columns, commonly mounted with a first injection and blow mold parts to an A-shaped upper yoke, with at least three locking collars, commonly mounted with a second injection and blow mold parts to a fixed platen. After joining opposing surfaces of the first and second injection and blow mold parts and locking opposing two or more locking columns and collars, clamping force is applied to the injection and blow mold parts by the interlocked column and collar elements. The means for bringing the first and second injection and blow mold parts together and separating them is separate from the clamping means.

Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 10 illustrates selected components of the actuators for opening and closing adjoining mold parts, and for clamping mold parts together for the multi-station assembly shown in FIGS. 2(a), 2(b) and 2(c).

FIG. 11 illustrates one example of upper and lower yokes that can be used with the multi-station assembly shown in FIGS. 2(a), 2(b) and 2(c).

DETAILED DESCRIPTION OF THE INVENTION

Figure 1A:
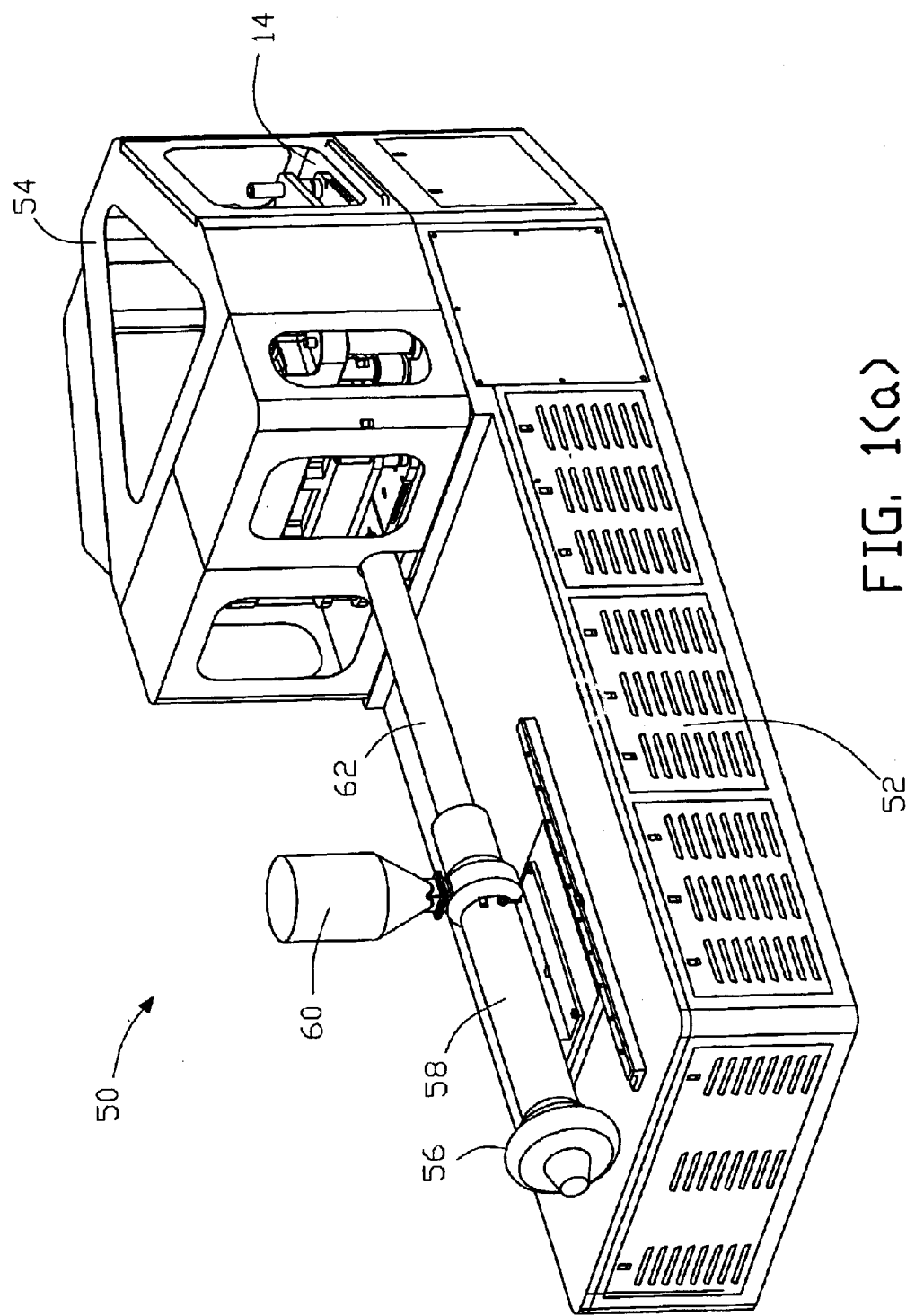
FIG. 1(*a*) is one example of an injection blow molding machine of the present invention with the enclosure around the plastifier equipment removed.
FIG. 1(b) is the injection blow molding machine shown in FIG. 1(a) with enclosures around the base and multi-station assembly removed.
Figure 1B:
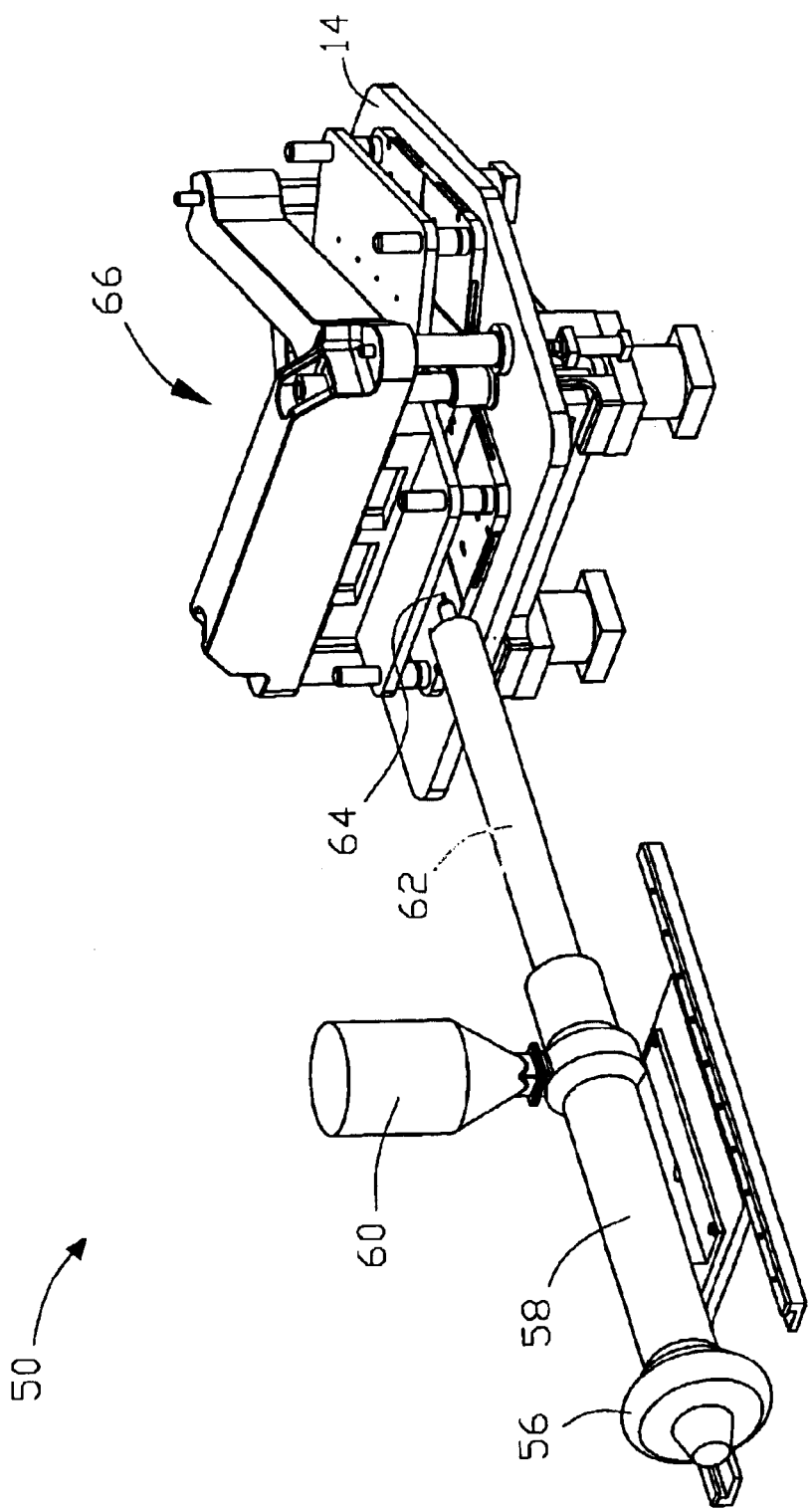

Referring now to the drawings, wherein like numerals indicate like elements there is shown in FIG. 1(a) and FIG. 1(b) one example of injection blow molding machine 50 of the present invention. In operation, raw material, such as pellets composed of a plastic polymer resin, are supplied via hopper 60 to the feed section end of a plastifier, which in this example is a reciprocating screw within screw housing 62. The screw can be driven by a suitable power source, such as a hydraulic or an electrical motor 56. The output shaft of the drive motor is connected to the reciprocating screw via a spline through one or more interconnecting drive components, such as a thrust bearing, within drive housing 58. The interconnecting drive components terminate at the feed end of the screw. The resin stock proceeds from the feed section of the screw to a compression section in which the softened pellets are compressed and melted into a resin melt. A final metering section of the screw homogenizes the melt and pumps it out of nozzle 64 into a clamped injection mold installed in the injection station as further described below.

Figure 2A:
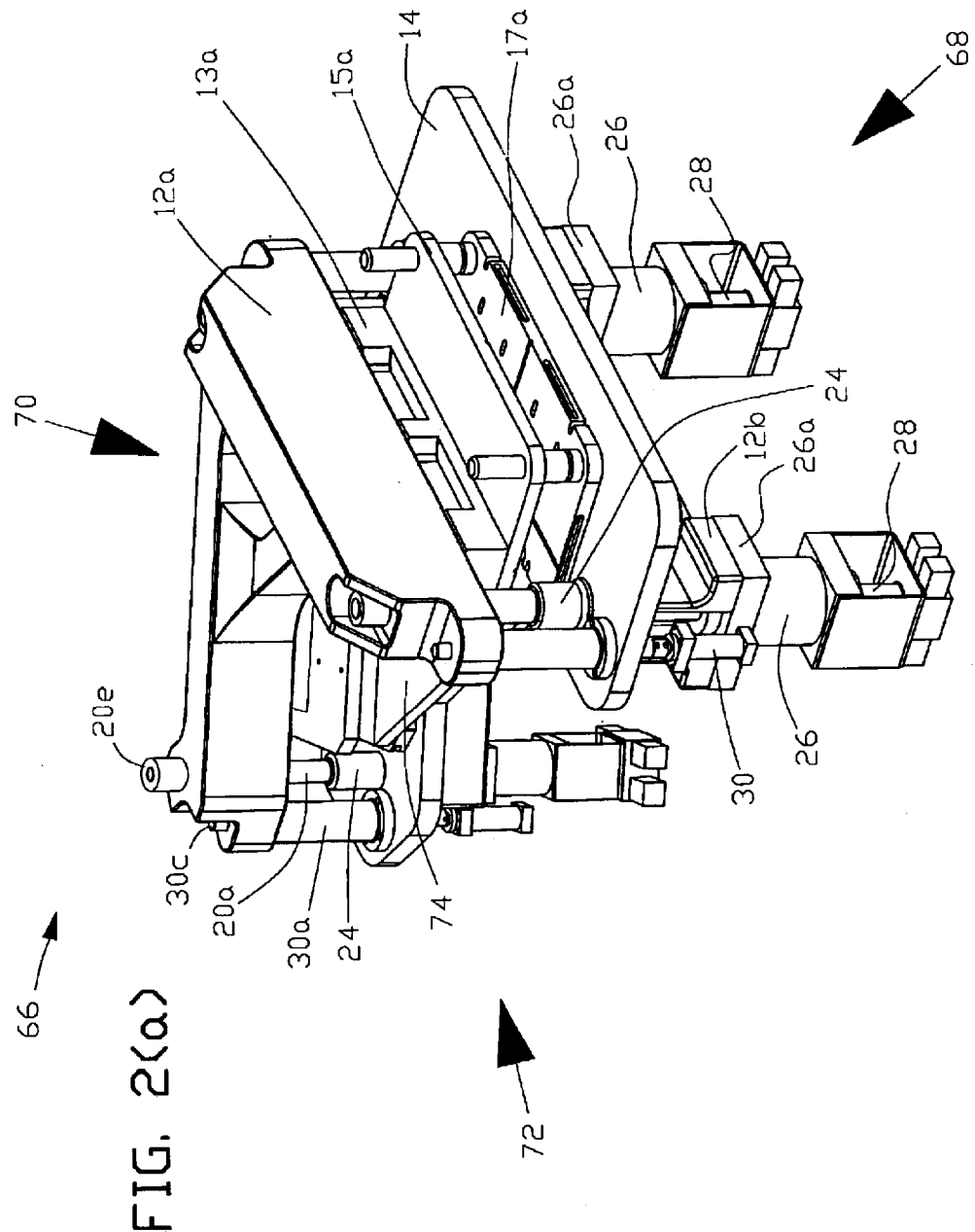
FIG. 2(a) is a first perspective view of a multi-station assembly utilizing one example of the clamping device of the present invention.
Figure 2B:
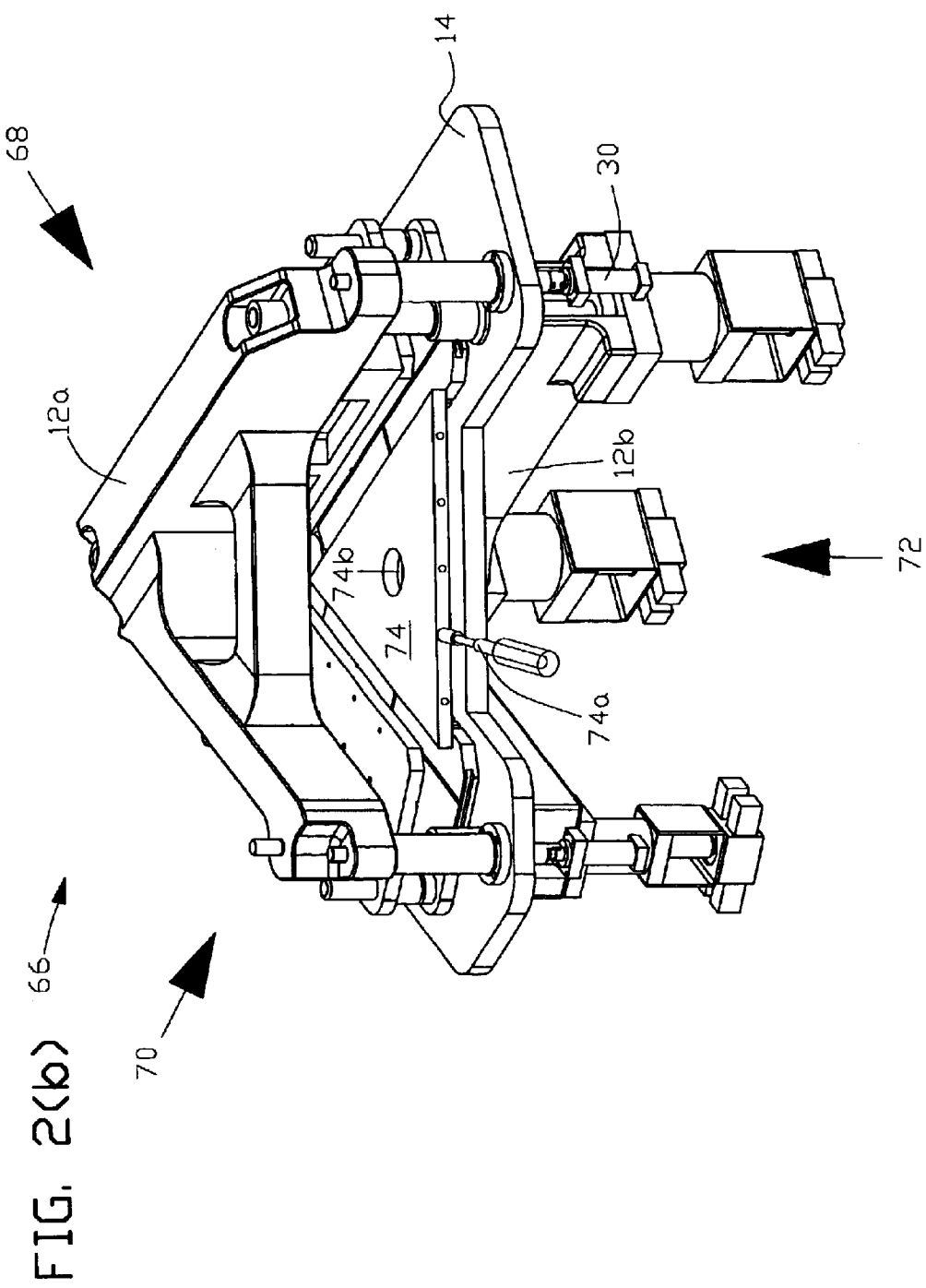
FIG. 2(b) is another perspective view of the multi-station assembly shown in FIG. 2(a).
Figure 2C:
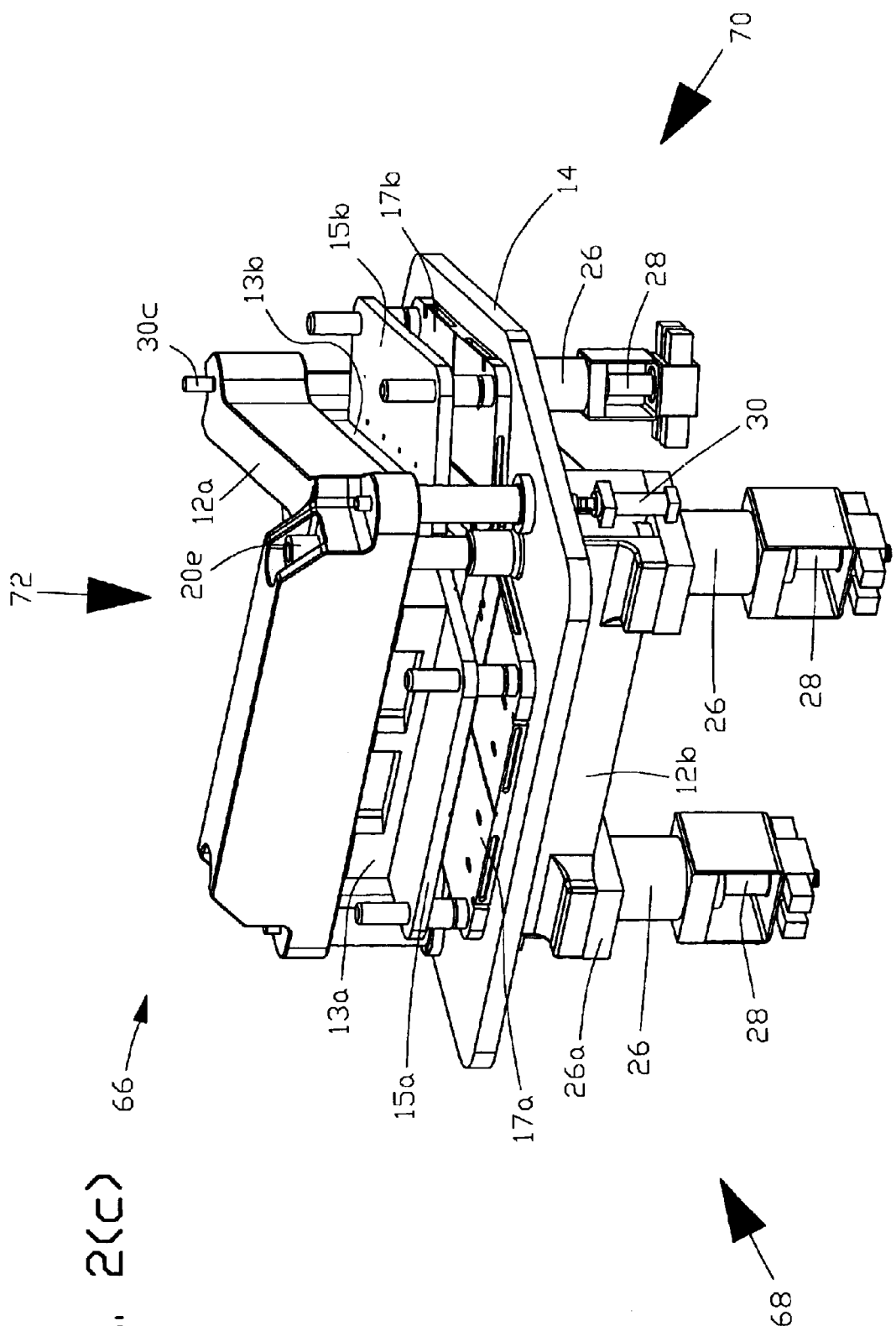
FIG. 2(c) is another perspective view of the multi-station assembly shown in FIG. 2(a).

FIGS. 2(a), 2(b) and 2(c) illustrate one example of an injection blow molding machine multi-station assembly of the present invention. Multi-station assembly 66 comprises injection mold station 68, blow mold station 72 and extraction (ejection) station 70. The injection station, blow mold station and ejection station are generally disposed in a triangular relationship around a transfer head (rotary indexing) table 74. One or more core rods, typically illustrated by core rod 74a in FIG. 2(b), are attached to each side of the rotary indexing table. Rotary indexing table 74 is rotationally driven, for example, by a motor drive having its output shaft attached to centered opening 74b in the rotary indexing table. In this arrangement core rods on any one of the three sides of the table are sequentially indexed by the rotary indexing table's drive between adjacent stations. In injection mold station 68, opposing surfaces of the upper and lower injection mold halves are joined together and clamped around at least one core rod, and the molten resin is injected from nozzle 64 into the void between the female portion of the clamped injection mold and the one or more male core rods to form a resin preform around the core rod. If multiple core rods are accommodated by the injection mold, then a manifold is used to distribute the molten resin from the nozzle to the core rods. After the injection mold halves are unclamped and opened, the rotary indexing table rotates the core rods with molten resin adhering to them approximately 120 degrees to blow mold station 70. In the blow mold station, upper and lower blow mold halves are closed and clamped between the core rods with the preforms on them. Air is blown through the core rods to push the outer surfaces of the preforms against the interior mold walls to shape the blow-molded product while the preform neck retains the shape formed by the preform. After the blow mold halves are unclamped and opened, the rotary indexing table's drive rotates the core rods with the necks of the blow-molded products adhering to them approximately 120 degrees to ejection station 72 wherein an ejector mechanism (not shown in the drawings) ejects the blow-molded product from the core rods. After ejection of the product, these core rods are indexed to injection mold station 68, and the injection blow molding process is repeated. Therefore when triangular rotary indexing table 74 is stopped in an indexed position, and the injection and blow molds are clamped, an equal number of preforms, or product, on core rods on each side of the table are being processed or ejected in each of the three stations.

Figure 3:
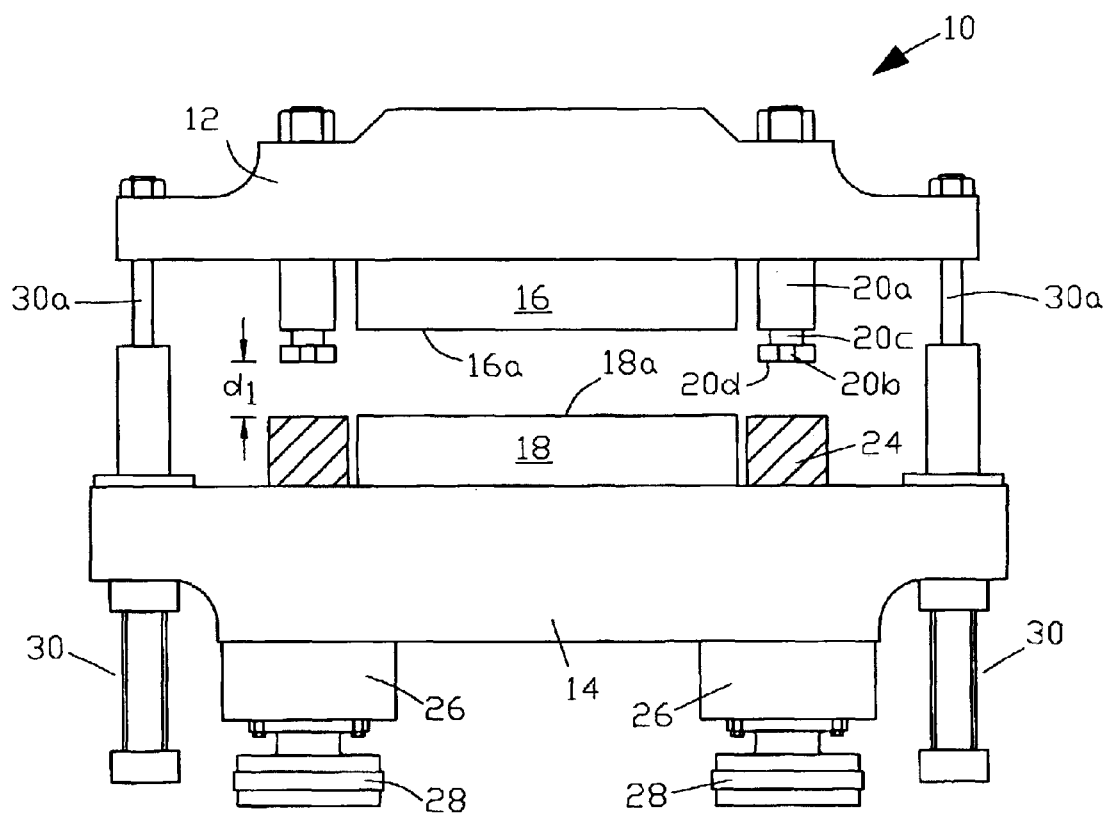
FIG. 3 illustrates one example of a clamping device of the present invention in the opened position.
Figure 9:
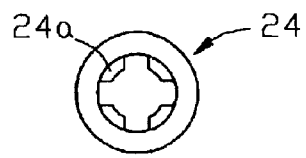
FIG. 9 illustrates a top plan view of one example of a locking collar used with one example of the clamping device of the present invention.

Referring now to FIG. 3 there is shown one example of the clamping device of the present invention that can be used in an injection mold station and/or a blow mold station. Clamping device 10 is shown in the opened position in FIG. 3. Mold halves or parts, 16 and 18, are situated between upper yoke assembly 12 and fixed platen, or machine table 14. Fixed platen or machine table 14 may also be other fixed structure attached to the machine table, such as a lower yoke assembly. Mold part 16 is attached directly or indirectly to the upper yoke assembly, and mold part 18 is attached directly or indirectly to the machine table. For example a mold die set and/or a spacer may be connected between the upper yoke and mold part 16, and/or the fixed platen and mold part 18 as illustrated below in other typical examples of the invention. Locking columns 20 are suitably attached to the upper yoke assembly and extend downward on either side of mold part 16. In this example of the invention, each locking column comprises main column 20a and locking cam 20b, which is attached to the main column by neck 20c. Locking collars 24 are suitably attached to machine table 14 and extend upward on either side of mold part 18. FIG. 9 is a top plan view of locking collar 24 showing collar tabs 24a in a recess of the locking collar that lock around neck 20c of cam 20b, as further described below. In this example of the invention, the end surface 20d of each locking column extends below facing surface 16a of upper mold part 16. Each locking column is axially aligned with an opposing locking collar. A pair of clamp movement actuators, open and close the clamping device by moving upper yoke assembly 12, with attached upper mold part 16 and locking columns 20, away from, or towards, fixed lower mold part 18 and the machine table. In this example of the invention, the clamp (opening and closing) movement actuators are hydraulic cylinders 30 with piston (output) rods 30a optionally housed in bushings to also serve as guide posts. The end of each output rod or shaft is suitably attached to upper yoke 12 so that when closing, piston rod 30a moves vertically downward into hydraulic cylinder 30, and when opening, the piston rod moves vertically upward out of the cylinder. Since the opening and closing actuators are not used to apply clamping forces, they can be positioned at an appreciable distance from the mold parts, for example, near the opposing ends of upper yoke 12, to avoid impeding access to the clamping area by preforms or blow-molded product. In the present invention, clamping force is obtained by securing (locking) opposing locking collars 24 and locking columns 20 together and applying a clamping force to the locked collars and columns as further described below.

In the transition of clamping device 10 from the opened to closed position, clamp movement hydraulic cylinders 30 move upper mold part 16 downward towards lower mold part 18 until opposing facing surfaces of the upper and lower mold parts are joined together but not clamped under pressure. At the same time, since the locking columns protrude below the facing surface of mold part 16, the end of each locking column, in this example of the invention, cam 20b, protrudes into the recess in the upper end of collar 24. In the closed position, the cams of the pair of locking columns are seated in the recesses of the respective opposing locking collar.

Figure 8:
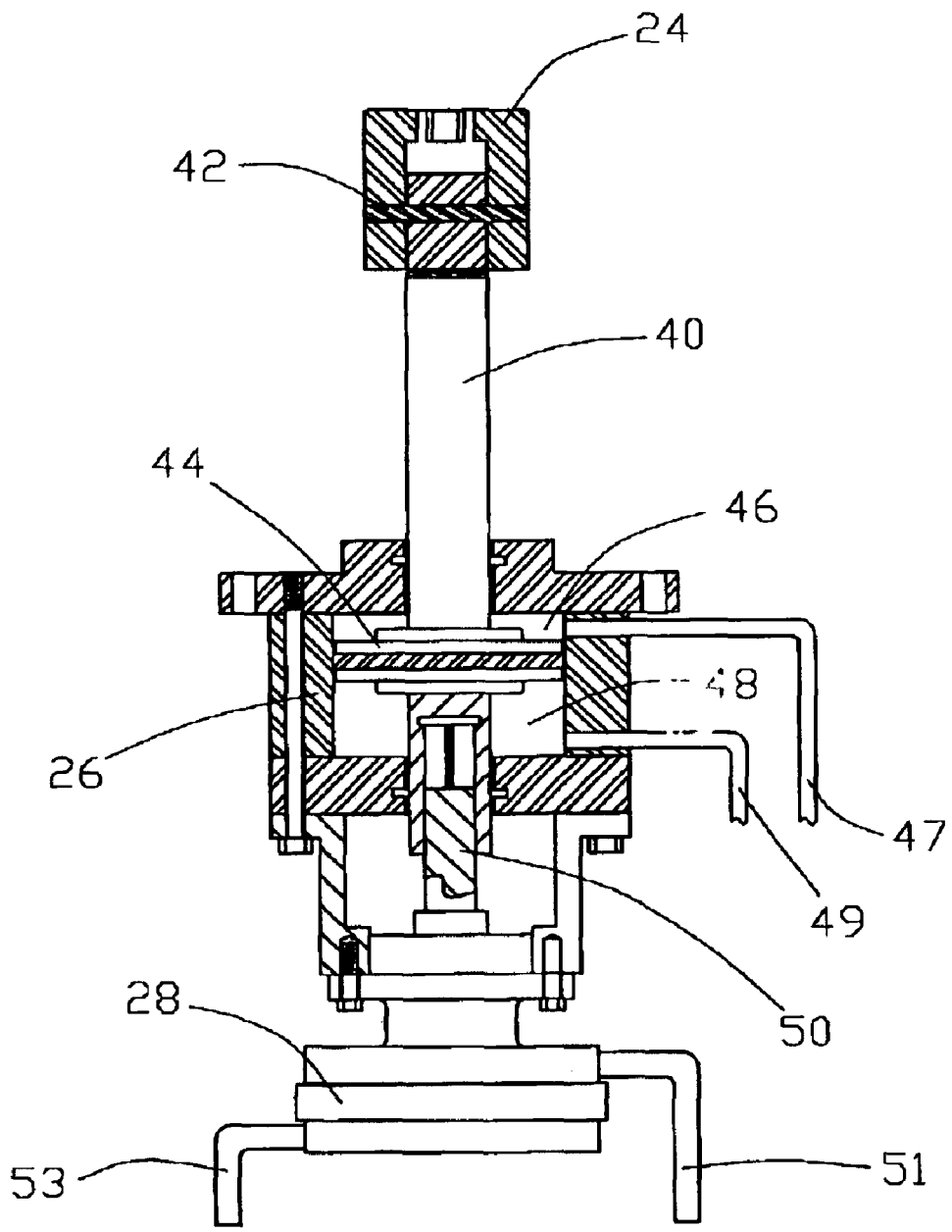
FIG. 8 is a cross sectional view of one example of a clamping actuator for use with a clamping device of the present invention.

FIG. 8 is a cross sectional view of a locking collar with associated clamping actuator 26 and rotation actuator 28 that is used in one example of the invention. In this non-limiting example of the invention, clamping actuator 26 is a linear hydraulic cylinder and rotation actuator 28 is a rotary hydraulic motor. Locking pin 42 retains locking collar 24 to one end of piston rod 40. In this non-limiting example of the invention, locking collar 24 is attached by screw thread to the end of rod 40. Collar 24 is attached to clamping actuator 26 via piston rod 40, which is attached to clamping piston 44. Sliding spline 50 is attached to clamping piston 44 and is rotatably controlled by the rotation actuator, which may be a hydraulic rotary motor. Spline 50, piston 44 and rod 40 are arranged so that rotation of spline 50 by the rotation actuator results in the rotation of collar 24.

After the cams are seated in the recesses of the collars, each collar is rotated to a locked position by supplying hydraulic fluid to hydraulic rotation actuator 28 via conduit 51. Collar tabs 24a lock around the neck 20c of each column to lock and hold the opposing locking columns and locking collars together.

In other examples of the invention, the rotation actuator may comprise a chain drive wherein one or more hydraulic rotation actuators 28 are replaced by a horizontally oriented sprocket that engages a chain driven by a suitable drive motor. In this arrangement one motor drive could be used to rotationally drive all locking collars used in a particular configuration.

Clamping force is then applied to the clamped mold parts by supplying hydraulic fluid to upper clamping piston chamber 46 via conduit 47 to apply pressure against the upper head of piston 44. With the columns locked in collars 24, the two mold parts are held together at the applied clamping force. If the clamped mold parts are an injection mold, then molten resin is injected into the mold. If the clamped mold parts are a blow mold, then air is blown into the preform to form the blow-molded product in the blow mold.

Applying the clamping force with a mold clamping means separate from the means for opening and closing the mold parts allows the opening and closing actuators to accomplish faster opening and closing of the mold parts since the opening and closing actuators are sized only for opening and closing, and not for clamping force requirements. The clamping force required to prevent injection mold parts from opening during injection of molten resin into the mold can approach 200 tons, which requires a relatively massive actuator that would be relatively slow acting as an opening and closing actuator. Further large actuators would block access to the molding area.

Once the molding step is completed (that is, forming a preform or blow-molded product), hydraulic fluid in upper piston chamber 46 is released through conduit 51 to decompress the clamping actuator. Each collar is then rotated to an unlocked position by supplying hydraulic fluid to rotation actuator 28 via conduit 53 to rotate the collar in a direction counter to the rotational direction for locking a collar to a column. Clamp movement hydraulic cylinders 30 then move mold part 16 upwards to the clamp opened position so that the preform or blow-molded product can be removed. In this particular example of the invention, since the locking collars are not raised or lowered, clamping actuator 26 may be a single chamber hydraulic cylinder without lower piston chamber 48.

Figure 4:
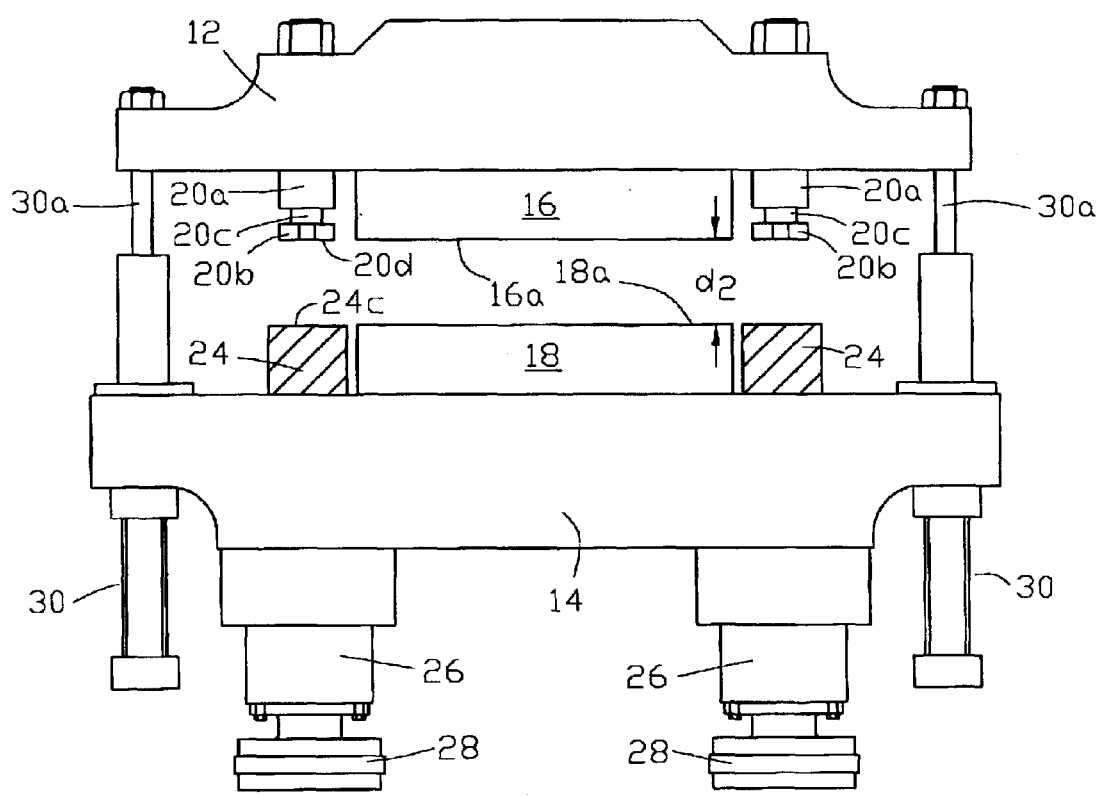
FIG. 4 illustrates another example of a clamping device of the present invention for an injection blow molding machine in the opened position.
Figure 5:
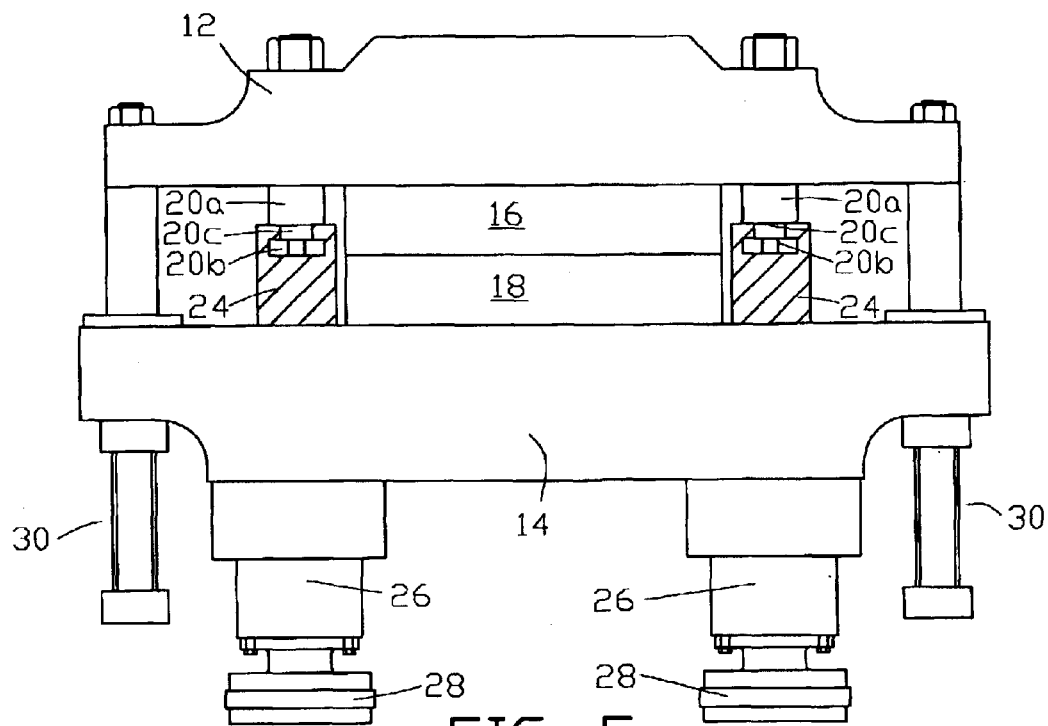
FIG. 5 illustrates the clamping device shown in FIG. 4 in the closed position.

FIG. 4 illustrates another example of the clamping device of the present invention that can be used in an injection mold station and/or a blow mold station. End surface 20d of each locking column, and more specifically in this particular example of the invention, the end surface of each locking cam 20b, is substantially flush with or above the facing surface 16a of upper mold part 16, and the end surface 24c of each locking collar 24 is substantially flush with or below the opposing facing surface 18a of lower mold part 18. In the transition of clamping device shown in FIG. 4 from the opened to the closed position, as shown in FIG. 5, after the opposing faces of mold parts 16 and 18 make contact, hydraulic fluid is supplied to lower piston chamber 48 via conduit 49 to raise collar 24 so that cam 20b sits in the recess of the collar. In other examples of the invention, the collar may be raised at the same time that the upper mold part 16 is being lowered. The collar is then rotated as in the previous examples of the invention to lock the mold parts together. Clamping pressure is applied as in the previous examples. The advantage of the present example over the example of the invention shown in FIG. 3 is that in the opened position, the entire distance, $d_2$, between the upper and lower opposing faces of the mold parts is available for access by preforms or finished blow-molded products on core rods to the mold clamping area. A further advantage of the present example of the invention is that it can conveniently accommodate multiple mold parts with different vertical lengths (heights) by changing the collar raise stroke distance (that is, the height that the locking collar raising and lowering actuator raises the collar) to recess cam 20b into the collar. In this particular example of the invention, actuator 26 also serves as the locking collar raise and lower actuator. Supplying hydraulic fluid to lower piston chamber 48 via conduit 49 will raise the locking collar to the required height. After locking rotating of the collar, lower piston chamber 48 can be depressurized by release of hydraulic fluid via conduit 49 and upper piston chamber 46 can be pressurized as described above to apply the clamping force. Further a two-directional hydraulic clamping actuator 26 as shown in FIG. 8 is only required for examples of the invention wherein the locking collar must be raised for mating with its opposing locking column. When the locking collar is not raised for mating with its opposing locking column, a single-directional hydraulic clamping actuator is required to apply a clamping force. After a blow molding process is completed in a clamped mold, clamping pressure can be removed by depressurizing the single-directional hydraulic clamping actuator.

Figure 6:
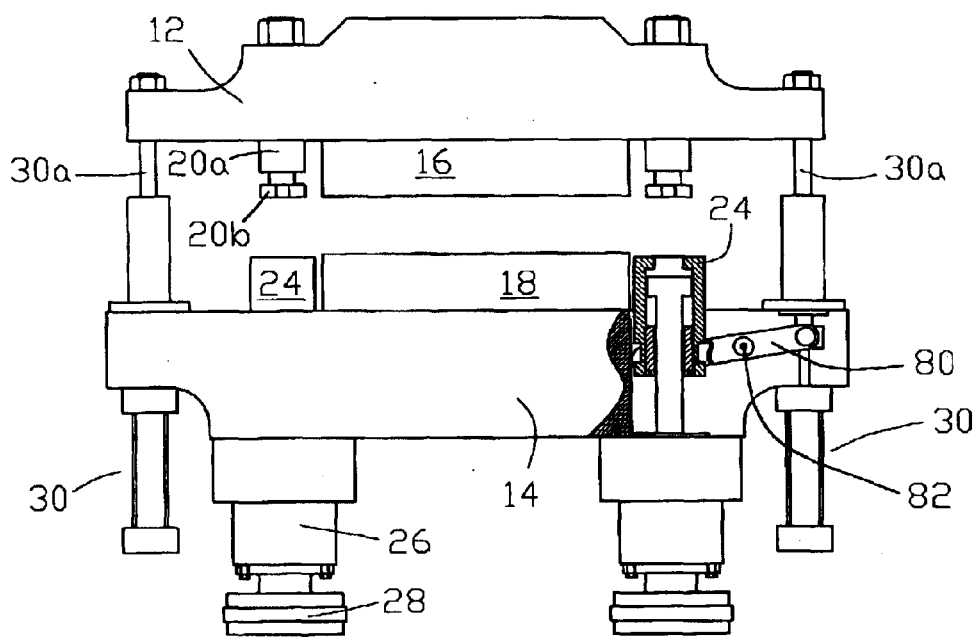
FIG. 6 illustrates another example of a clamping device of the present invention in the opened position in which a pivot arm is used to raise and lower locking collars for mating with a locking column.
Figure 7:
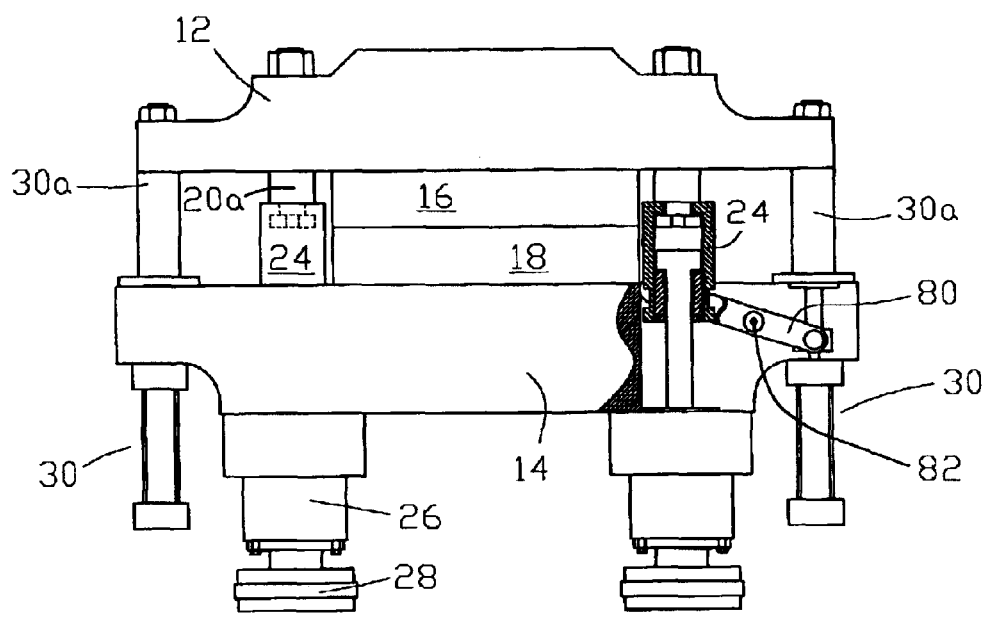
FIG. 7 illustrates the clamping device shown in FIG. 6 in the closed position.

FIG. 6 and FIG. 7 illustrate another example of the invention wherein locking collar 24 is raised and lowered by the pivot action of pivot arm or member 80 about pivot point 82, as typically illustrated in the figures, so that when clamp movement actuator 30 brings upper mold part 16 adjacent to lower mold part 18 the pivot action raises the locking collar to the appropriate height for mating with the opposing locking column. Consequently in this arrangement with locking collar raising and lowering, only a single-directional hydraulic clamping actuator is required.

In another example of the invention, locking collars 24 can be located in place of locking columns 20 in FIG. 3 or FIG. 4, and locking columns 20 can be located in place of locking collars 24 in the same figures. That is, the locking collars may be associated with upper yoke 12 and located adjacent to upper mold part 16, and the locking columns may be associated with the machine table, or fixed platen 14, and adjacent to lower mold part 18. In this arrangement physically separated rotation actuators and clamping actuators are provided since the rotation actuators would be situated on top of the upper yoke, with each rotation actuator in axial alignment with a locking collar, so that the rotation actuator could rotate the collar after the end of an opposing locking column is inserted into it, to lock and unlock the columns and collars together. Generally, because of its size and weight, the clamping actuators would remain beneath the fixed table, with each of the clamping actuators in axial alignment with a locking column, to apply a clamping force when the locking columns and locking collars are locked together. Further if raising and lowering locking collars are used in this example of the invention, a separate means for raising and lowering the locking collars, now associated with the upper yoke, may be provided as illustrated in FIG. 6, for example, except that the pivot arm is connected at its opposing ends to the clamp movement actuator and the locking collar, now associated with the upper yoke to achieve lowering of the locking collars when the clamp movement actuator brings the upper and lower mold parts together, and raising of the locking collars when the clamp movement actuator separates the upper and lower mold parts. In general, for all examples, of the invention, the clamping force may be applied either to the locking collar or locking column when the column and collar are locked together.

Returning now to the first example of the invention, in FIGS. 2(*a*), 2(*b*) and 2(*c*), upper yoke 12*a* is an A-shaped structure that forms a single upper yoke for the clamping devices used in injection station 68 and blow mold station 70. The injection station and blow mold station are each situated under one of the two legs of the A-shaped structure. The center member of the A-shaped structure connecting the two legs together is an optional structural support member. In this non-limiting example of the invention, by utilizing the A-shaped upper yoke structure, one of four separate pairs of clamp movement actuators and clamping actuators are eliminated since one pair situated near the joined end of the two legs serves both the injection and blow mold stations as further described below.

Injection mold die set comprises upper injection mold die plate 15*a* and lower injection mold die plate 17*a*, and provides a means for attaching the upper and lower injection mold halves (not shown), respectively, to upper yoke 12*a* and machine table 14. In this non-limiting example of the invention, optional spacer 13*a* serves as an intervening connecting element between the upper yoke and the upper injection mold part. The advantage of spacer 13*a* is that interchangeable spacers having different heights can be used to accommodate mold parts with different heights. The upper and lower injection mold parts are suitably attached to the opposing surfaces of the upper and lower injection mold dies, respectively. Piston rods 30*a* housed in bushings serve as guide posts to assure vertical alignment between paired upper and lower molding surfaces (and attached mold parts) as the mold parts move between opened and closed positions.

In a similar arrangement for blow mold station 70, upper blow mold die plate 15*b* and lower blow mold die plate 17*b*, provide a means for attaching the upper and lower blow mold halves (not shown), respectively, to upper yoke 12*a* and machine table 14. In this non-limiting example of the invention, optional spacer 13*b* may also be used as an intervening connecting element between the upper yoke and the upper blow mold part. The upper and lower blow mold parts are suitably attached to the opposing surfaces of the upper and lower blow mold dies, respectively.

As previously mentioned, with use of the A-shaped structure for upper yoke 12*a* in this example of the invention, three each of clamp movement actuators, locking columns, locking collars and clamp actuators are required for both the injection mold station and the blow mold station. These elements are most clearly illustrated in FIG. 10 with selected components of the multi-station assembly not shown. Also in FIG. 10, locking collar 24 is not shown attached to the threaded end of piston rod 40 at which opening 42*a* is provided for insertion of locking pin 42. Section 20*a* ' of each locking column passes through an opening in upper yoke 12*a* and is secured to the upper yoke by suitable fastener 20*e*. Section 30*a* ' of each piston rod 30*a* of hydraulic cylinder 30 passes through an opening in upper yoke 12*a* and is secured to the upper yoke by suitable fastener 30*c*.

The operation of the clamp movement actuators, locking columns, locking collars and associated actuators for the example of the invention shown in FIGS. 2(*a*), 2(*b*) and 2(*c*) and FIG. 10 are similar to the operation of these components in other examples of the invention.

FIG. 11 illustrates A-shaped upper yoke 12*a* and optional lower yoke 12*b* that can be used to secure clamping and rotation actuators 26 and 28, respectively, in place below machine table 14. The top of lower yoke 12*b* is attached to the bottom of machine table 14. Attachment plate 26*a* for each clamping and rotation actuators is attached to the bottom of lower yoke 12*b*. As noted above, clamping forces for an injection mold can be on the order of 200 tons, which requires the use of large hydraulic clamping cylinders that can weight several hundred pounds. Clamping actuator replacements are necessary over the service life of an injection blow molding machine. Providing notched openings 12*c* in lower yoke 12*b* facilitates removal of an installed clamping actuator by allowing the actuator to be tilted for removal, once the adjacent relatively small and lightweight clamp movement hydraulic cylinder 30 is removed. Otherwise the clamping and rotation actuator would need to be dropped vertically down for its entire length to clear the level of machine table 14, which would requiring raising of the height of the machine table. In some arrangements, the increased height can be significant and make access to multi-station assembly 66 above the machine table difficult.

Typically clamping pressure for a preform mold is much greater than that for a blow mold. For example, a ratio of 6:1 is typical between preform mold clamping pressure and blow mold clamping pressure. With the A-shaped arrangement of the upper yoke, the clamping cylinder at the joined end of the two legs must apply clamping force for both the injection mold and the blow mold while the other two cylinders apply only the clamping force for the injection mold or the blow mold. The control system for hydraulic fluid to the three clamping cylinders incorporates a feedback system to ensure that an equalized clamping pressure is applied across both the preform mold and the blow mold.

In other examples of the invention, respective locations of the locking columns and locking collars may be reversed so that the columns, rather than the collars, are associated with the clamping and rotation actuators, and, for the example of the invention shown in FIG. 4 and FIG. 5, the columns, rather than the collars, are raised and lowered. Further other suitable column and collar locking elements are contemplated as being within the scope of the invention as long as they a means for holding the two mold parts together for application of clamping pressure between the mold parts. While hydraulic means are used for mold opening and closing, holding and clamping functions, other drive means, such as an electric drive, may be used for one or more of these functions. While the mold in the example comprises two parts and, in some examples of the invention, two clamp movement actuators, locking columns and locking collars are used, other multiple combinations of mold parts and/or clamp movement actuators, locking columns and locking collars may be used in the present invention.

Although the above examples illustrate the clamping device of the present invention with an injection blow mold machine having three stations, the invention can be applied to injection blow molding machines with any number of stations, and the clamping device of the present invention may be other than horizontally oriented as shown in the above examples of the invention. Further while the above examples illustrate the clamping device of the present invention with an injection blow molding machine, the invention can be applied to other types of injection molding machines, such as, but not limited to, injection stretch blow molding machines.

The foregoing examples do not limit the scope of the disclosed invention. The scope of the disclosed invention is further set forth in the appended claims.

What is claimed is:

1. A clamping device for clamping together mold parts in a blow molding process, the clamping device comprising:
    an upper yoke and a fixed platen, the upper yoke having an upper yoke opposing surface, the upper yoke opposing surface facing a fixed platen opposing surface;
    an upper mold part and a lower mold part, the upper mold part attached to the upper yoke opposing surface and the lower mold part attached to the fixed platen opposing surface, the upper mold part having an upper mold part opposing surface, the upper mold part opposing surface facing a lower mold part opposing surface;
    a means for moving the upper yoke towards the fixed platen and away from the fixed platen to bring the upper and lower mold part opposing surfaces in contact with each other by moving the upper yoke towards the fixed platen, and to separate the upper and lower mold part opposing surfaces;
    a means for clamping together the upper and lower mold parts, the means for clamping being separate from the means for moving the upper yoke towards the fixed platen and away from the fixed platen, the means for clamping comprising:
        an at least two locking columns, at least one of the at least two locking columns disposed on opposing sides of the upper mold part, each of the at least two locking columns disposed closer to the upper mold part than the means for moving the upper yoke towards the fixed platen and away from the fixed platen, each of the at least two locking columns having a locking column first end attached to the upper yoke, each of the at least two locking columns having a locking column second end;
        an at least two locking collars, the number of the at least two locking collars equal to the number of the at least two locking columns, at least one of the at least two locking collars disposed on opposing sides of the lower mold part, each of the at least two locking collars axially aligned with one of the at least two locking columns, each of the at least two locking collars having a means for locking with the locking column second end of the at least two locking columns aligned with each of the at least two locking collars;
        a locking actuator for each of the at least two locking collars, the locking actuator activating the means for locking with the locking column second end to lock each of the at least two locking columns to each of the at least two locking collars when the means for moving the upper yoke towards the fixed platen has brought the upper and lower mold part opposing surfaces in contact with each other; and
        a clamping actuator for each of the at least two locking collars, the clamping actuator providing a means for clamping the mold parts together.

2. The clamping device of claim 1 wherein the means for moving the upper yoke towards the fixed platen and away from the fixed platen comprises a pair of clamp movement actuators, each of the pair of clamp movement actuators having a first movement actuator end attached near to the opposing ends of the upper yoke and a fixed movement actuator end attached below the fixed platen, the first movement actuator end movably connected to the fixed movement actuator end.

3. The clamping device of claim 2 wherein the each of the pair of clamp movement actuators comprises a hydraulic cylinder at the fixed movement actuator end and a hydraulic piston rod at the first movement actuator end.

4. The clamping device of claim 1 wherein the locking column second end comprises a cam attached to the locking column by a neck, and the means for locking with the locking column second end comprises a recess in each of the at least two locking collars, the interior perimeter of the recess having a plurality of tabs.

5. The clamping device of claim 4 wherein the locking actuator comprises a means for rotating each of the at least two locking collars when the cam of each of the at least two locking columns aligned with each of the at least two locking collars is inserted in the recess in each of the at least two aligned locking collars below the tabs to selectively lock the tabs around the cam to lock each of the at least two locking columns to each of the at least two locking collars.

6. The clamping device of claim 5 wherein the locking actuator comprises a rotary hydraulic motor for each one of the at least two locking collars, the rotary hydraulic motor having its output connect to each of the at least two locking collars.

7. The clamping device of claim 5 wherein the clamping actuator comprises a hydraulic cylinder for each one of the at least two locking collars, the hydraulic cylinder having its output piston rod connected to each of the at least two locking collars for selectively applying a hydraulic clamping force to clamp the mold parts together when each of the at least two locking columns are locked to each of the at least two locking collars, and removing the hydraulic clamping force to unclamp the mold parts, and the locking actuator comprises a rotary hydraulic motor for each one of the at least two locking collars, the rotary hydraulic motor having its output connect to each of the at least two locking collars.

8. The clamping device of claim 1 wherein the means for clamping together the upper and lower mold parts further comprises a means for raising and lowering the at least two locking collars.

9. A method of clamping an upper mold part and a lower mold part together in a blow molding process, the method comprising the steps of:
    attaching an upper mold part to an upper yoke;
    attaching a lower mold part to a fixed platen;
    bringing an opposing surface of the upper mold part in contact with an opposing surface of the lower mold part by moving the upper yoke towards the fixed platen with at least two movement actuators disposed near to the opposing ends of the upper yoke;
    attaching an at least two locking columns at a locking column first end to opposing sides of the upper mold part;
    joining a locking column second end of each one of the at least two locking columns with an opposing axially aligned locking collar of an at least two locking collars located on opposing sides of the lower mold part;
    locking the locking column second end of each one of the at least two locking columns with the opposing axially aligned locking collar; and
    clamping the upper and lower mold parts together by applying a clamping force to each of at least two locking collars locked to an opposing axially aligned locking column.

10. The method of claim 9 wherein the step of joining the locking column second end of each one of the at least two locking columns with an opposing axially aligned locking collar of an at least two locking collars further comprises the step of inserting a cam on the end of the locking collar second end into a recess in the opposing axially aligned locking collar.

11. The method of claim 10 wherein the step of joining the locking column second end of each one of the at least two locking columns with an opposing axially aligned locking collar of an at least two locking collars further comprises the step of raising the locking collar to insert a cam on the end of the locking collar second end into a recess in the opposing axially aligned locking collar.

12. The method of claim 10 wherein the step of locking the locking column second end of each one of the at least two locking columns with the opposing axially aligned locking collar comprises rotating the locking collar to lock the cam in the recess with a plurality of tabs disposed around the interior perimeter of the recess.

13. The method of claim 12 wherein the step of clamping the upper and lower mold parts together by applying a clamping force to each of at least two locking collars locked to an opposing axially aligned locking column further comprises applying a pressure force to each one of the at least two locking collars.

14. The method of claim 9 wherein the step of locking the locking column second end of each one of the at least two locking columns with the opposing axially aligned locking collar comprises rotating the locking collar by means of a rotary actuator having its output connected to the output of a clamp actuator, the output of the clamp actuator connected to the locking collar, and the step of clamping the upper and lower mold parts together by applying a clamping force to each of at least two locking collars locked to an opposing axially aligned locking column further comprises applying a pressure force to each one of the at least two locking collars with the clamp actuator.

15. A clamping device for clamping together mold parts in a blow molding process, the clamping device comprising:
    an upper yoke and a fixed platen, the upper yoke having an upper yoke opposing surface, the upper yoke opposing surface facing a fixed platen opposing surface;
    an upper mold part and a lower mold part, the upper mold part attached to the upper yoke opposing surface and the lower mold part attached to the fixed platen opposing surface, the upper mold part having an upper mold part opposing surface, the upper mold part opposing surface facing a lower mold part opposing surface;
    a means for moving the upper yoke towards the fixed platen and away from the fixed platen to bring the upper and lower mold part opposing surfaces in contact with each other by moving the upper yoke towards the fixed platen, and to separate the upper and lower mold part opposing surfaces;
    a means for clamping together the upper and lower mold parts, the means for clamping being separate from the means for moving the upper yoke towards the fixed platen and away from the fixed platen, the means for clamping comprising:
        an at least two locking columns, at least one of the at least two locking columns disposed on opposing sides of the lower mold part, each of the at least two locking columns disposed closer to the lower mold part than the means for moving the upper yoke towards the fixed platen and away from the fixed platen, each of the at least two locking columns having a locking column first end attached to the fixed platen, each of the at least two locking columns having a locking column second end;
        an at least two locking collars, the number of the at least two locking collars equal to the number of the at least two locking columns, at least two of the at least two locking collars disposed on opposing sides of the upper mold part, each of the at least two locking collars axially aligned with one of the at least two locking columns, each of the at least two locking collars having a means for locking with the locking column second end of the at least two locking columns aligned with each of the at least two locking collars;
        a locking actuator for each of the at least two locking collars, the locking actuator activating the means for locking with the locking column second end to lock each of the at least two locking columns to each of the at least two locking collars when the means for moving the upper yoke towards the fixed platen has brought the upper and lower mold part opposing surfaces in contact with each other; and a clamping actuator for each of the at least two locking columns, the clamping actuator providing a means for clamping the mold parts together.

16. The clamping device of claim 15 wherein the means for moving the upper yoke towards the fixed platen and away from the fixed platen comprises a pair of clamp movement actuators, each of the pair of clamp movement actuators having a first movement actuator end attached near to the opposing ends of the upper yoke and a fixed movement actuator end attached below the fixed platen, the first movement actuator end movably connected to the fixed movement actuator end.

17. The clamping device of claim 15 wherein the locking column second end comprises a cam attached to the locking column by a neck, and the means for locking with the locking column second end comprises a recess in each of the at least two locking collars, the interior perimeter of the recess having a plurality of tabs.

18. The clamping device of claim 17 wherein the locking actuator comprises a means for rotating each of the at least two locking collars when the cam of each of the at least two locking columns aligned with each of the at least two locking collars is inserted in the recess in each of the at least two aligned locking collars below the tabs to selectively lock the tabs around the cam to lock each of the at least two locking columns to each of the at least two locking collars.

19. The clamping device of claim 18 wherein the clamping actuator comprises a hydraulic cylinder for each one of the at least two locking columns, the hydraulic cylinder having its output piston rod connected to each of the at least two locking columns for selectively applying a hydraulic clamping force to clamp the mold parts together when each of the at least two locking columns are locked to each of the at least two locking collars, and removing the hydraulic clamping force to unclamp the mold parts, and the locking actuator comprises a rotary hydraulic motor for each one of the at least two locking collars, the rotary hydraulic motor having its output connect to each of the at least two locking collars.

20. The clamping device of claim 15 wherein the means for clamping together the upper and lower mold parts further comprises a means for raising and lowering the at least two locking collars.

21. A method of clamping an upper mold part and a lower mold part together in a blow molding process, the method comprising the steps of:
   attaching an upper mold part to an upper yoke;
   attaching a lower mold part to a fixed platen;
   bringing an opposing surface of the upper mold part in contact with an opposing surface of the lower mold part by moving the upper yoke towards the fixed platen with at least two movement actuators disposed near to the opposing ends of the upper yoke;
   attaching an at least two locking columns at a locking column first end to opposing sides of the lower mold part;
   joining a locking column second end of each one of the at least two locking columns with an opposing axially aligned locking collar of an at least two locking collars located on opposing sides of the upper mold part;
   locking the locking column second end of each one of the at least two locking columns with the opposing axially aligned locking collar; and
   clamping the upper and lower mold parts together by applying a clamping force to each of at least two locking columns locked to an opposing axially aligned locking collars.

22. The method of claim 21 wherein the step of joining the locking column second end of each one of the at least two locking columns with an opposing axially aligned locking collar of an at least two locking collars further comprises the step of inserting a cam on the end of the locking collar second end into a recess in the opposing axially aligned locking collar.

23. The method of claim 22 wherein the step of joining the locking column second end of each one of the at least two locking columns with an opposing axially aligned locking collar of an at least two locking collars further comprises the step of lower the locking collar to insert a cam on the end of the locking collar second end into a recess in the opposing axially aligned locking collar.

24. The method of claim 22 wherein the step of locking the locking column second end of each one of the at least two locking columns with the opposing axially aligned locking collar comprises rotating the locking collar to lock the cam in the recess with a plurality of tabs disposed around the interior perimeter of the recess.

25. The method of claim 24 wherein the step of clamping the upper and lower mold parts together by applying a clamping force to each of at least two locking collars locked to an opposing axially aligned locking column further comprises applying a pressure force to each one of the at least two locking columns.

26. The method of claim 21 wherein the step of locking the locking column second end of each one of the at least two locking columns with the opposing axially aligned locking collar comprises rotating the locking collar by means of a rotary actuator having its output connected to the locking collar, and the step of clamping the upper and lower mold parts together by applying a clamping force to each of at least two locking columns locked to an opposing axially aligned locking collar further comprises applying a pressure force to each one of the at least two locking columns.

27. A blow molding machine comprising:
   a plastifier for producing a molten resin;
   an injection station for injecting the resin into an injection mold, the injection mold comprising an upper and lower injection mold parts, the upper and lower mold parts clamped around an at least one preform;
   a blow molding station for blowing a gas into each of the at least one preform into a blow-molded product in a blow mold, the blow mold comprising an upper and lower blow mold parts;
   a clamping device for clamping at least the upper and lower injection mold parts or the upper and lower blow mold parts, the clamping device comprising:
      an upper yoke and a fixed platen, the upper yoke having an upper yoke opposing surface, the upper yoke opposing surface facing a fixed platen opposing surface;
      the upper injection mold part or upper blow mold part attached to the upper yoke opposing surface and the lower injection mold part or lower blow mold part attached to the fixed platen opposing surface, the upper injection mold part or upper blow mold part having an upper injection mold part opposing or an upper injection blow mold part opposing surface, the upper injection mold part or upper blow mold part opposing surface facing a lower injection mold part opposing surface or a lower blow mold part opposing surface;
      a means for moving the upper yoke towards the fixed platen and away from the fixed platen to bring the upper and lower injection or blow mold part opposing surfaces in contact with each other by moving the upper yoke towards the fixed platen, and to separate the upper and lower injection or blow mold part opposing surfaces;

a means for clamping together the upper and lower injection or blow mold parts, the means for clamping being separate from the means for moving the upper yoke towards the fixed platen and away from the fixed platen, the means for clamping comprising:

an at least two locking columns, at least one of the at least two locking columns disposed on opposing sides of the upper injection or blow mold part, each of the at least two locking columns disposed closer to the upper injection or blow mold part than the means for moving the upper yoke towards the fixed platen and away from the fixed platen, each of the at least two locking columns having a locking column first end attached to the upper yoke, each of the at least two locking columns having a locking column second end;

an at least two locking collars, the number of the at least two locking collars equal to the number of the at least two locking columns, at least one of the at least two locking collars disposed on opposing sides of the lower injection or blow mold part, each of the at least two locking collars axially aligned with one of the at least two locking columns, each of the at least two locking collars having a means for locking with the locking column second end of the at least two locking columns aligned with each of the at least two locking collars;

a locking actuator for each of the at least two locking collars, the locking actuator activating the means for locking with the locking column second end to lock each of the at least two locking columns to each of the at least two locking collars when the means for moving the upper yoke towards the fixed platen has brought the upper and lower injection or blow mold part opposing surfaces in contact with each other; and a clamping actuator for each of the at least two locking collars, the clamping actuator providing a means for clamping the injection or blow mold parts together.

28. The blow molding machine of claim 27 further comprising an upper injection or blow mold die connected between the upper yoke and the upper injection or blow mold part, and a lower injection or blow mold die connected between the fixed platen and the lower injection or blow mold die.

29. The blow molding machine of claim 28 further comprising a spacer connected between the upper yoke and the upper injection or blow mold die.

30. The blow molding machine of claim 27 wherein the means for moving the upper yoke towards the fixed platen and away from the fixed platen comprises a pair of clamp movement actuators, each of the pair of clamp movement actuators having a first movement actuator end attached near to the opposing ends of the upper yoke and a fixed movement actuator end attached below the fixed platen, the first movement actuator end movably connected to the fixed movement actuator end.

31. The blow molding machine of claim 27 wherein the locking column second end comprises a cam attached to the locking column by a neck, and the means for locking with the locking column second end comprises a recess in each of the at least two locking collars, the interior perimeter of the recess having a plurality of tabs.

32. The clamping device of claim 29 wherein the locking actuator comprises a means for rotating each of the at least two locking collars when the cam of each of the at least two locking columns aligned with each of the at least two locking collars is inserted in the recess in each of the at least two aligned locking collars below the tabs to selectively lock the tabs around the cam to lock each of the at least two locking columns to each of the at least two locking collars.

33. A clamping device for clamping together mold parts in a blow molding process, the clamping device comprising:

an A-shaped upper yoke, the first leg of the A-shaped upper yoke comprising an injection mold station and the second leg of the A-shaped upper yoke comprising a blow mold station;

a fixed platen, the fixed platen having a fixed platen opposing surface facing a first leg opposing surface and a second leg opposing surface of the A-shaped upper yoke;

an upper injection mold part and a lower injection mold part, the upper injection mold part attached to the first leg opposing surface of the A-shaped upper yoke, and the lower injection mold part attached to the fixed platen opposing surface, the upper injection mold part having an upper injection mold part opposing surface, the upper injection mold part opposing surface facing a lower injection mold part opposing surface;

an upper blow mold part and a lower blow mold part, the upper blow mold part attached to the second leg opposing surface of the A-shaped upper yoke, and the lower blow mold part attached to the fixed platen opposing surface, the upper blow mold part having an upper blow mold part opposing surface, the upper blow mold part opposing surface facing a lower blow mold part opposing surface;

a means for moving the A-shaped upper yoke towards the fixed platen and away from the fixed platen to bring the upper and lower injection and blow mold part opposing surfaces in contact with each other by moving the A-shaped upper yoke towards the fixed platen, and to separate the upper and lower mold part opposing surfaces, a means for clamping together the upper and lower injection and blow mold parts, the means for clamping being separate from the means for moving the A-shaped upper yoke towards the fixed platen and away from the fixed platen, the means for clamping comprising:

an at least three locking columns, each of the at least three locking columns disposed on opposing sides of the upper injection and blow mold parts, each of the at least three locking columns disposed closer to the upper injection and blow mold parts than the means for moving the A-shaped upper yoke towards the fixed platen and away from the fixed platen, each of the at least three locking columns having a locking column first end attached to the upper yoke, each of the at least three locking columns having a locking column second end;

an at least three locking collars, the number of the at least three locking collars equal to the number of the at least three locking columns, at least one of the at least three locking collars disposed on opposing sides of the lower injection and blow mold parts, each of the at least three locking collars axially aligned with one of the at least three locking columns, each of the at least three locking collars having a means for locking with the locking column second end of the at least three locking columns aligned with each of the at least three locking collars;

a locking actuator for each of the at least three locking collars, the locking actuator activating the means for locking with the locking column second end to lock each of the at least three locking columns to each of the at least thee locking collars when the means for moving the A-shaped upper yoke towards the fixed platen has brought the upper and lower injection and blow mold part opposing surfaces in contact with each other; and a clamping actuator for each of the at least three locking collars, the clamping actuator providing a means for clamping the injection and blow mold parts together.

34. The clamping device of claim 33 wherein the means for moving the A-shaped upper yoke towards the fixed platen and away from the fixed platen comprises three clamp movement actuators, each of the three clamp movement actuators having a first movement actuator end attached near to each of the two non-connected ends of the first and second legs of the A-shaped yoke and the single connected ends of the first and second legs of the A-shaped yoke, and a fixed movement actuator end attached below the fixed platen, the first movement actuator end movably connected to the fixed movement actuator end.

35. The clamping device of claim 34 wherein the each of the three clamp movement actuators comprises a hydraulic cylinder at the fixed movement actuator end and a hydraulic piston rod at the first movement actuator end.

36. The clamping device of claim 33 wherein the locking column second end comprises a cam attached to the locking column by a neck, and the means for locking with the locking column second end comprises a recess in each of the at least two locking collars, the interior perimeter of the recess having a plurality of tabs.

37. The clamping device of claim 36 wherein the locking actuator comprises a means for rotating each of the at least three locking collars when the cam of each of the at least three locking columns aligned with each of the at least three locking collars is inserted in the recess in each of the at least two aligned locking collars below the tabs to selectively lock the tabs around the cam to lock each of the at least two locking columns to each of the at least three locking collars.

38. The clamping device of claim 37 wherein the locking actuator comprises a rotary hydraulic motor for each one of the at least three locking collars, the rotary hydraulic motor having its output connect to each of the at least three locking collars.

39. The clamping device of claim 37 wherein the clamping actuator comprises a hydraulic cylinder for each one of the at least three locking collars, the hydraulic cylinder having its output piston rod connected to each of the at least three locking collars for selectively applying a hydraulic clamping force to clamp the mold parts together when each of the at least three locking columns are locked to each of the at least three locking collars, and removing the hydraulic clamping force to unclamp the mold parts, and the locking actuator comprises a rotary hydraulic motor for each one of the at least three locking collars, the rotary hydraulic motor having its output connect to each of the at least three locking collars.

* * * * *